Figure 1:
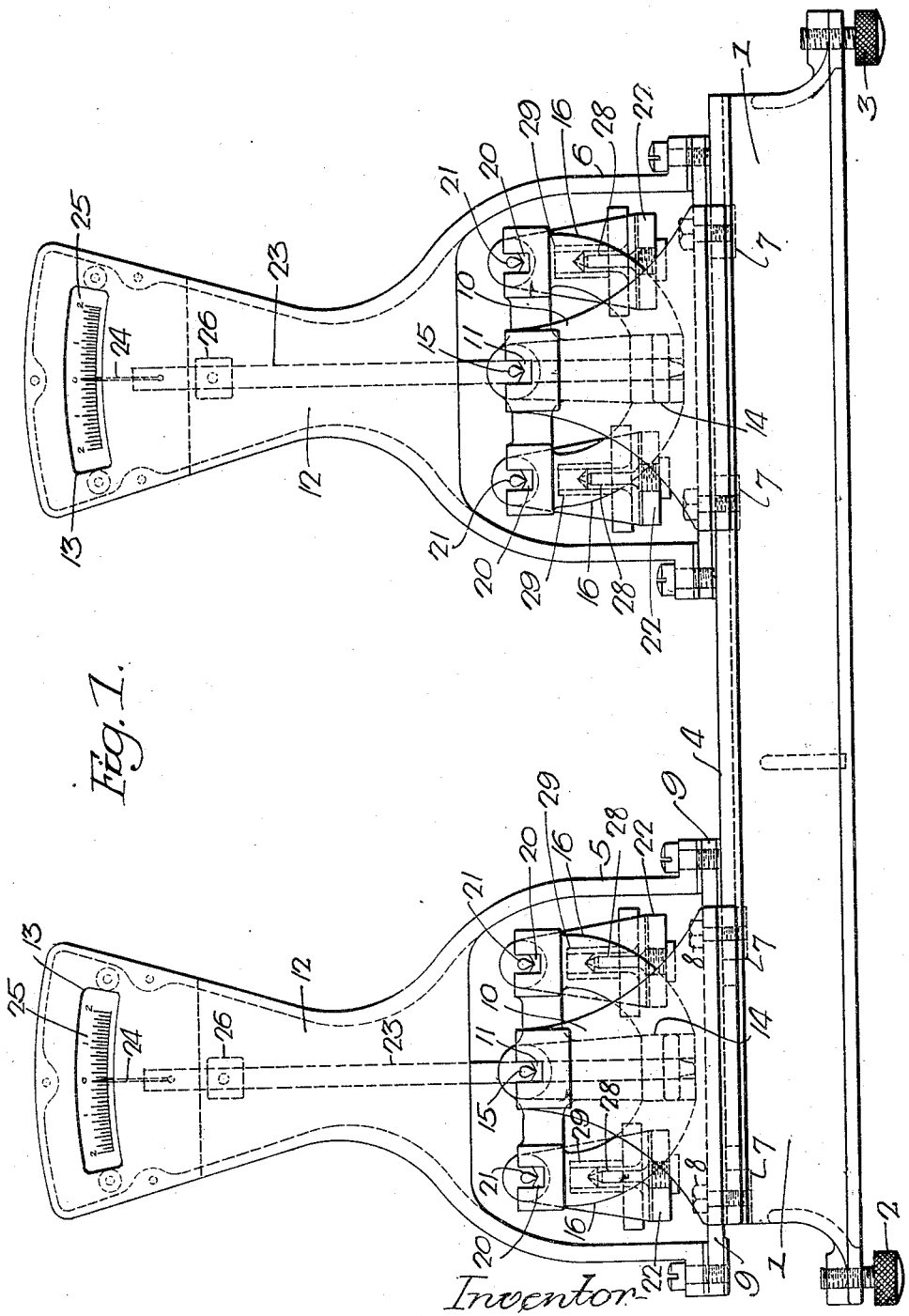

Nov. 1, 1927.

J. LUNDGREN 1,647,923

METHOD AND APPARATUS FOR WEIGHING

Filed March 7, 1923   3 Sheets-Sheet 1

Inventor
Jacob Lundgren, by his Attorneys
Howson & Howson

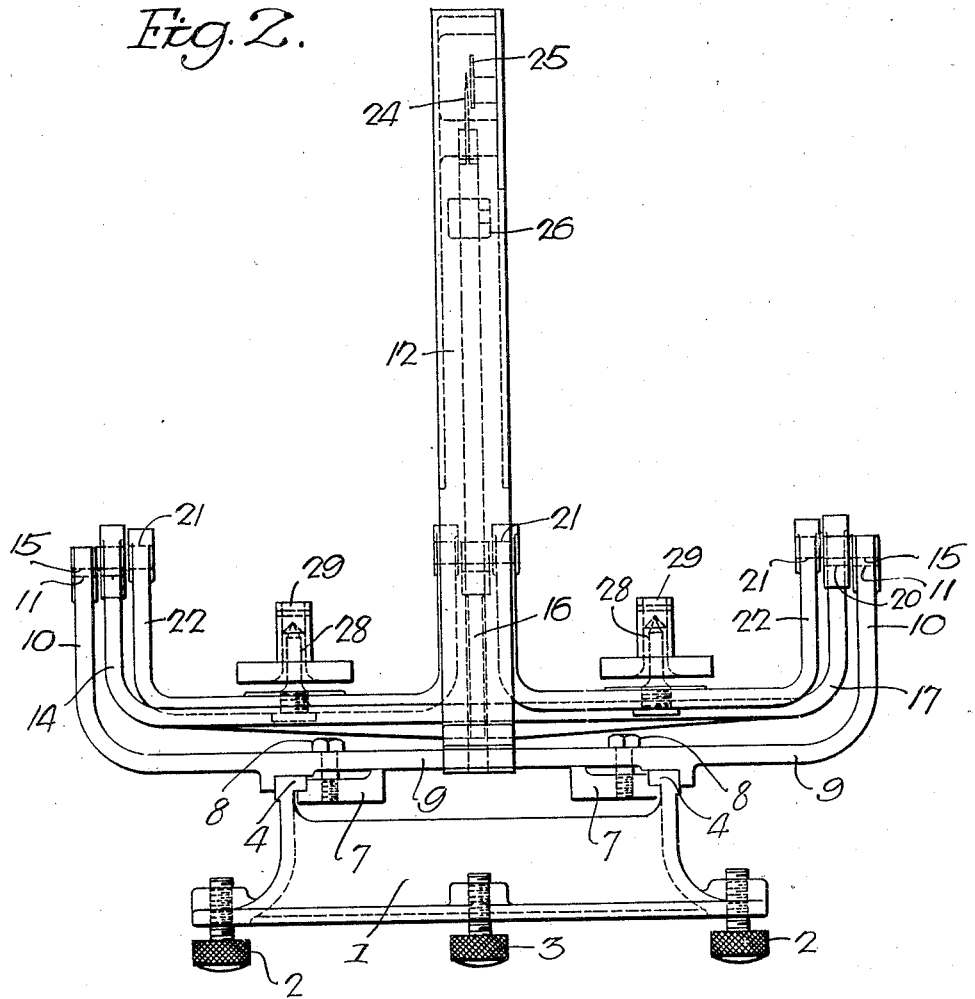

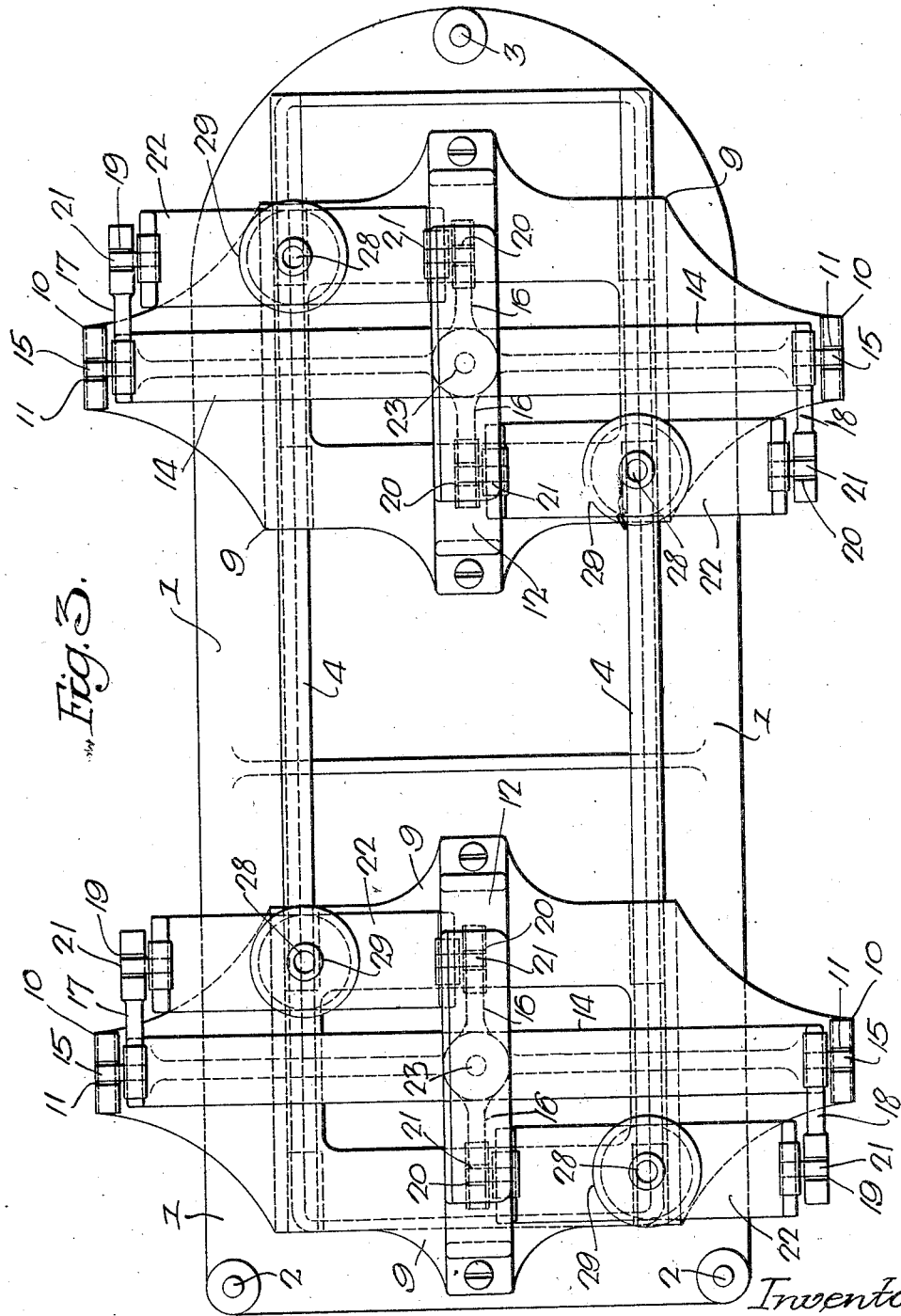

Patented Nov. 1, 1927.

1,647,923

UNITED STATES PATENT OFFICE.

JACOB LUNDGREN, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA.

METHOD AND APPARATUS FOR WEIGHING.

Application filed March 7, 1923. Serial No. 623,486.

One object of this invention is to provide a device for weighing and indicating differences between the weights of the two ends of an elongated body such as the connecting rod of an engine or pump and the invention more especially contemplates relatively simple, accurate and substantial means for quickly and conveniently comparing a connecting rod or similar elongated body with a master or test body in order to determine the difference between the weights of its ends and those of said master rod.

Another object of the invention is to provide a weighing device capable of simultaneously indicating the differences between weights of the two ends of a rod or similar body to be tested and those of a master rod.

These objects and other advantageous ends I attain as hereinafter set forth, reference being had to the accompanying drawings, in which, Figs. 1 and 2 are respectively a front and an end elevation of a weighing device constructed in accordance with my invention; and, Fig. 3 is a plan of the device shown in Figs. 1 and 2.

In the above drawings, 1 represents a base structure in the form of an open elongated frame having two adjustable feet 2—2 at the opposite sides of one end and a single adjustable foot 3 at the middle of its opposite end. Said base includes a pair of integral parallel and longitudinally extending guides or tracks 4—4 adjacent opposite ends of which are mounted two weighing scales 5 and 6 both of the same construction. These two scales are adjustable on the guide rails 4 toward and from each other and may be immovably retained in any adjusted positions by clamps 7—7 which by means of bolts 8—8 may be caused to rigidly hold said scales in place.

Each of the scales 5 or 6 above referred to consists of an elongated body 9 in the form of a generally flat plate-like structure extending across and resting on the rails 4—4 and having its ends 10—10 turned up parallel with each other to provide supports for bearings 11. Extending across the middle of this body and projecting upwardly in the central longitudinal vertical plane of the base 1 is a hollow standard 12 having in one side of its upper part a horizontally elongated opening or window 13. An elongated U-shaped main scale beam 14 has projecting outwardly from the upper ends of its arms or branches, knife edges 15 respectively engaging the bearings 11 of the side members 10, so that it is free to oscillate. At its middle, the scale beam 14 has two oppositely projecting and upwardly extended arms 16—16, in addition to which at one end it has an arm 17 projecting laterally to one side of its plane and at its opposite end a second and similar arm 18 projecting from the opposite side of said plane. These two laterally projecting arms 17 and 18 are each provided with a bearing 19 and a similar bearing 20 is provided in the upper portions of the two arms 16 respectively in horizontal alignment with said two first bearings. Each pair of these aligned bearings 19 and 20 serve to support knife edges 21—21 projecting from the arms of auxiliary U-shaped supports 22, so that as shown in Fig. 3 there is one of the auxiliary supports on each side of the central vertical plane of the main scale beam. The latter has centrally fixed to it an upwardly projecting pointer 23 constituting a pendulum, extending within the hollow of the standard 12 and at its upper end carrying an indicator 24 so positioned as to be visible through the opening 13 within the upper part of the standard where it cooperates with or moves adjacent to a suitably graduated scale 25 calibrated in any desired units. The pointer 23 has adjustably mounted on it a weight 26 whereby the automatic deflection of the indicator consequent upon a predetermined unit load on the auxiliary supports, may be regulated at will.

Each of the auxiliary supports 22 has centrally mounted upon it a suitable load carrying element, in the present instance a bolt or stem 28 extending upwardly and carrying a flanged bushing 29 in such manner that the position of the auxiliary supports 22 is independent of the deflection of the bushing 29 by the standard and test bodies.

The two scales or weighing instruments 5 and 6 are similar in construction, the load carrying element 28 on the right hand side of each of their main scale beams being the same distance apart as the similar load carrying elements on the left hand side of said beams.

With the above described arrangement of parts, the indicators 24 normally stand at zero positions on the scales 25. Under conditions of use an elongated body having the desired or standard disposition of metal or material in its end portions is placed upon the two bushings 29 on one side of the longitudinal central line of the frame 1, where it serves as the master or test piece. A similar rod to be tested is now placed upon the bushings 29 on the opposite side of the longitudinal center line of the frame 1, whereupon the indicator 24 of the instrument 5 for example is deflected from its zero position by an amount which is indicative of the difference in weight between those ends of the two rods which are supported by said instrument 5. Similarly, the indicator 24 of the instrument 6 likewise gives a reading which is a measure of the difference in the weights of the two ends of the rods carried by said instrument 6, so that each instrument at once gives an indication of the amount by which one end of the rod being tested differs from the standard weight of the corresponding end of the test piece. It is thus possible to quickly compare large numbers of rods or bars with a standard or master bar or rod to ascertain the difference in the weights of the ends of each rod or to determine the variation of the weights of said ends and those of the corresponding ends of the master rod.

I claim:

1. A weighing instrument comprising a main scale beam mounted to oscillate about its longitudinal axis; two auxiliary supports respectively carried by said main beam on opposite sides of the longitudinal axis thereof and positioned in longitudinally spaced relation; and means for indicating deflections of said main beam.

2. A weighing instrument comprising a supporting structure having bearings; a main scale beam of U-form journaled at its opposite ends in said bearings so as to swing on its longitudinal axis; two auxiliary supports carried by said main scale beam and free to oscillate on axes parallel with and on opposite sides of the axis of oscillation of the main scale beam; with means for indicating the deflection of the main scale beam.

3. The combination of a supporting structure; a U-shaped main scale beam having portions of the ends of its arms journaled on the supporting structure and including oppositely projecting arms adjacent its middle together with other oppositely projecting arms respectively at its opposite ends; two auxiliary supports carried by said two sets of arms on opposite sides of the axis of oscillation on the main scale beam; with means for indicating deflections of the main scale beam.

4. A weighing instrument comprising a supporting structure; two main scale beams mounted on said structure and free to oscillate on parallel axes; two auxiliary supports carried by each of said main scale beams and mounted to oscillate on axes parallel with those of said main beams; means carried by said auxiliary supports for supporting the end portions of two elongated bodies; with means for indicating the deflections of the main scale beams.

5. The combination in a weighing instrument of two main scale beams mounted to oscillate on parallel axes; supports respectively carried by said main scale beams for the reception of the two ends of a master bar; two other supports also carried by the scale beams respectively for the reception of the ends of a bar to be tested; with means for simultaneously indicating the difference between the weights of the ends of the master bar and the ends of the bar to be tested.

6. The combination in a weighing instrument of a supporting structure; two main scale beams thereon mounted to swing about parallel horizontal axes; two swinging supports carried by each of the main scale beams, respectively on opposite sides of its axis of oscillation; and means for indicating deflections of said main scale beams when two rods are mounted each with its ends respectively engaging a pair of opposite swinging supports of the two scale beams.

7. The combination of two similar weighing devices including means on one device for supporting one end of a rod and means on the other device for supporting the second end of said rod; means on said two devices for respectively supporting the ends of a master rod, and means for indicating the differences in the weights of the ends of said two rods.

8. The combination of two similar weighing devices including means on one device for supporting one end of a rod and means on the other device for supporting the second end of said rod; means on said two devices for respectively supporting the ends of a master rod, and means for indicating the differences in the weights of the ends of said two rods; with a base for supporting said weighing devices to permit of their adjustment toward and from each other.

9. The method of weighing an elongated body which consists of simultaneously balancing its ends against the ends of a master body; and noting the difference between the weight of each end of the body under test and the weight of the corresponding end of the master body.

10. The method of weighing the ends of a rod which consists in simultaneously balancing the opposite ends of such rod against the opposite ends of a master rod of similar form; and noting the differences between the weights of the ends of the rod under test and those of the ends of the master rod.

11. A weighing instrument comprising a main scale beam; two auxiliary supports carried by said main beam, the axes of said auxiliary supports being longitudinally offset with respect to the axis of movement of the main scale beam; a secondary support individual to each auxiliary support; and means responsive to the deflection of the main scale beam.

JACOB LUNDGREN.